United States Patent
Nitzan et al.

(10) Patent No.: US 9,135,830 B2
(45) Date of Patent: Sep. 15, 2015

(54) AIRPORT TRAVEL SURFACE EDGE LIGHTING AND FOREIGN OBJECT DETECTION SYSTEM AND METHOD

(75) Inventors: Alon Nitzan, Rosh Haayin (IL); Aviv Goner, Kibbutz Naan (IL); Yehiel Nadav, Rishon LeZion (IL); Alex Homsky, Petach Tikva (IL)

(73) Assignee: XSIGHT SYSTEMS LTD., Rosh Haayin (IL)

( * ) Notice: Subject to any disclaimer, the term of this patent is extended or adjusted under 35 U.S.C. 154(b) by 440 days.

(21) Appl. No.: 13/029,343

(22) Filed: Feb. 17, 2011

(65) Prior Publication Data

US 2011/0254725 A1    Oct. 20, 2011

Related U.S. Application Data

(60) Provisional application No. 61/338,559, filed on Feb. 18, 2010.

(51) Int. Cl.
| | |
|---|---|
| *G01S 13/91* | (2006.01) |
| *G08G 5/00* | (2006.01) |
| *B64F 1/18* | (2006.01) |
| F21W 111/06 | (2006.01) |
| G08G 5/06 | (2006.01) |
| G01S 13/93 | (2006.01) |

(52) U.S. Cl.
CPC ............... *G08G 5/0082* (2013.01); *B64F 1/18* (2013.01); *G01S 13/91* (2013.01); *F21W 2111/06* (2013.01); *G01S 2013/916* (2013.01); *G01S 2013/9335* (2013.01); *G08G 5/065* (2013.01)

(58) Field of Classification Search
CPC ...... B64F 1/18; F21W 2111/06; G01S 13/91; G01S 2013/9335; G01S 2013/916
USPC .......................................................... 342/52
See application file for complete search history.

(56) References Cited

U.S. PATENT DOCUMENTS

| | | | | |
|---|---|---|---|---|
| 2,456,179 | A | * | 12/1948 | Finer ............................ 362/431 |
| 2,767,308 | A | * | 10/1956 | Bear ............................. 362/232 |
| 3,196,267 | A | * | 7/1965 | Abolins ........................ 362/548 |
| 3,237,004 | A | * | 2/1966 | Abolins ........................ 362/337 |
| 3,609,677 | A | * | 9/1971 | Norberg ........................ 340/982 |
| 3,683,172 | A | * | 8/1972 | Noyes ........................... 362/147 |
| 3,838,421 | A | | 9/1974 | Dasse-Hartaut |
| 3,878,506 | A | * | 4/1975 | Young ........................... 340/953 |

(Continued)

FOREIGN PATENT DOCUMENTS

| | | |
|---|---|---|
| DE | 10104950 A1 | 10/2001 |
| EP | 0 613 111 A1 | 8/1994 |

(Continued)

OTHER PUBLICATIONS

Galati et al. "Airport Surface Surveillance with a Network of Miniradars." IEEE Transactions on Aerospace and Electronic Systems. vol. 35, Issue 1. Jan 1999. pp. 331-338.*

(Continued)

*Primary Examiner* — Matthew M Barker
(74) *Attorney, Agent, or Firm* — Ladas & Parry LLP (57) ABSTRACT

An object detection system for use in airports including an airport travel surface light assembly, a rotatable sensor assembly mounted on the airport travel surface light assembly for sensing objects and an omnidirectional illuminator mounted above the rotatable sensor assembly.

10 Claims, 14 Drawing Sheets

(56) References Cited

U.S. PATENT DOCUMENTS

| | | | |
|---|---|---|---|
| 4,499,527 | A | 2/1985 | Tauber et al. |
| 4,751,624 | A * | 6/1988 | Russo et al. ............ 362/276 |
| 5,003,441 | A | 3/1991 | Crowe et al. |
| 5,212,547 | A | 5/1993 | Otsuki |
| 5,243,340 | A | 9/1993 | Norman et al. |
| 5,373,429 | A | 12/1994 | Kasurinen |
| 5,375,058 | A | 12/1994 | Bass |
| 5,629,691 | A | 5/1997 | Jain |
| 5,939,987 | A | 8/1999 | Cram |
| 6,055,080 | A | 4/2000 | Furstenau |
| 6,064,429 | A | 5/2000 | Belk et al. |
| 6,126,299 | A | 10/2000 | Hypes et al. |
| 6,155,703 | A | 12/2000 | Rizkin et al. |
| 6,181,261 | B1 | 1/2001 | Miles, Jr. et al. |
| 6,281,806 | B1 | 8/2001 | Smith et al. |
| 6,295,007 | B1 | 9/2001 | O'Meara |
| 6,380,871 | B1 | 4/2002 | Kaplan |
| 6,486,825 | B1 | 11/2002 | Smithey |
| 6,509,844 | B1 | 1/2003 | Eyring |
| 6,563,432 | B1 | 5/2003 | Millgard |
| 6,575,597 | B1 | 6/2003 | Cramer et al. |
| 6,606,035 | B2 | 8/2003 | Kapadia et al. |
| 6,690,295 | B1 | 2/2004 | De Boer |
| 6,917,309 | B2 | 7/2005 | Nitzan et al. |
| 6,940,424 | B2 | 9/2005 | Philiben et al. |
| 6,956,493 | B1 | 10/2005 | Youngblood |
| 7,175,314 | B2 * | 2/2007 | Laenen et al. ............ 362/269 |
| 7,253,748 | B2 * | 8/2007 | Nitzan et al. ............ 340/945 |
| 7,455,432 | B2 * | 11/2008 | Craw et al. ............ 362/373 |
| 7,495,600 | B2 * | 2/2009 | Rees et al. ............ 342/29 |
| 7,663,507 | B2 * | 2/2010 | Nitzan et al. ............ 340/952 |
| 7,825,849 | B2 * | 11/2010 | Tsuchida et al. ............ 342/70 |
| 7,940,208 | B2 * | 5/2011 | Baharav et al. ............ 342/179 |
| 8,029,151 | B2 * | 10/2011 | Butler ............ 362/20 |
| 2002/0018344 | A1 * | 2/2002 | Sears et al. ............ 362/265 |
| 2002/0030609 | A1 | 3/2002 | Baumgartner et al. |
| 2002/0080046 | A1 | 6/2002 | Derringer |
| 2002/0093433 | A1 | 7/2002 | Kapadia et al. |
| 2002/0109625 | A1 | 8/2002 | Gouvary |
| 2002/0163461 | A1 | 11/2002 | Smithey |
| 2004/0056779 | A1 * | 3/2004 | Rast ............ 340/985 |
| 2007/0055446 | A1 * | 3/2007 | Schiffmann et al. ............ 701/301 |
| 2010/0109913 | A1 * | 5/2010 | Nitzan et al. ............ 340/947 |
| 2010/0110698 | A1 * | 5/2010 | Harwood et al. ............ 362/365 |
| 2011/0050482 | A1 * | 3/2011 | Nanami ............ 342/52 |

FOREIGN PATENT DOCUMENTS

| | | |
|---|---|---|
| EP | 1 170 715 A2 | 1/2002 |
| EP | 1 995 707 A2 | 11/2008 |
| WO | 02/056054 A2 | 7/2002 |

OTHER PUBLICATIONS

USPTO OA mailed Sep. 18, 2008 in connection with U.S. Appl. No. 11/823,835.

USPTO OA mailed May 1, 2009 in connection with U.S. Appl. No. 11/823,835.

USPTO NOA mailed Oct. 6, 2009 in connection with U.S. Appl. No. 11/823,835.

USPTO OA mailed Nov. 15, 2010 in connection with U.S. Appl. No. 12/686,887.

USPTO OA mailed Dec. 27, 2010 in connection with U.S. Appl. No. 12/059,377.

International Preliminary Report on Patentability dated Oct. 14, 2010 issued during Prosecution of Applicant's PCT/IL09/00332.

ESR dated Feb. 13, 2009 issued during prosecution of EP 08 01 4340.

ISR dated Aug. 6, 2009 issued during prosecution of PCT/IL09/00332.

Canadian Office Action dated Oct. 1, 2012 for Application 2,505,841.

USPTO NFOA dated Dec. 13, 2012 in connection with U.S. Appl. No. 12/686,887.

Furstenau et al.: "Extrinsic Fabry-Perot Interferometer vibration and acoustic sensor systems for airport ground traffic monitoring", IEE Proceedings in Optoelectronics, vol. 144, No. 3, Jun. 1997, pp. 134-144.

* cited by examiner

AIRPORT TRAVEL SURFACE EDGE LIGHTING AND FOREIGN OBJECT DETECTION SYSTEM AND METHOD

REFERENCE TO RELATED APPLICATIONS

Reference is hereby made to U.S. Provisional Patent Application Ser. No. 61/338,559, filed Feb. 18, 2010, entitled AIRPORT TRAVEL SURFACE EDGE LIGHTING AND FOREIGN OBJECT DETECTION SYSTEM AND METHOD, the disclosure of which is hereby incorporated by reference and priority of which is hereby claimed pursuant to 37 CFR 1.78(a) (4) and (5)(i).

Reference is also made to the following U.S. Patents and Patent Applications which are related to the subject matter of this patent application and are hereby incorporated by reference in their entirety:

U.S. Pat. Nos. 6,917,309; 7,253,748 and 7,663,507.
U.S. patent application Ser. Nos. 12/059,377 and 12/686,887.

FIELD OF THE INVENTION

The present invention relates to object detection systems and methods particularly suitable for use in airports.

BACKGROUND OF THE INVENTION

The following patent publications are believed to represent the current state of the art and are hereby incorporated by reference in their entirety:

U.S. Pat. Nos. 4,499,527; 5,185,815; 5,212,547; 5,243,340; 5,373,429; 5,375,058; 5,629,691; 5,939,987; 6,064,429; 6,126,299; 6,155,703; 6,181,261; 6,281,806; 6,295,007; 6,380,871; 6,486,825; 6,509,844; 6,563,432; 6,575,597; 6,606,035; 6,690,295; 6,940,424 and 6,956,493.

U.S. Patent Publication Nos. 2002/0080046; 2002/0109625; 2002/0093433; 2002/0030609 and 2002/0163461.

SUMMARY OF THE INVENTION

The present invention seeks to provide improved object detection systems and methods for use in airports.

There is thus provided in accordance with a preferred embodiment of the present invention, an object detection system including an airport travel surface light assembly, a rotatable sensor assembly mounted on the airport travel surface light assembly for sensing objects and an omnidirectional illuminator mounted above the rotatable sensor assembly.

Preferably, the omnidirectional illuminator is mounted on the rotatable sensor assembly for rotation therewith.

Additionally, the airport travel surface light assembly includes at least first and second generally oppositely directed directional illuminators. Preferably, the at least first and second generally oppositely directed directional illuminators include at least first and second generally oppositely directed LED directional illuminators.

In accordance with a preferred embodiment of the present invention the airport travel surface light assembly includes a static airport travel surface light assembly.

Preferably, the rotatable sensor assembly includes an imaging radar sub-assembly including imaging radar output image analysis functionality, an optical imaging sub-assembly including optical imaging output image analysis functionality and object detection functionality receiving an output from the imaging radar output image analysis functionality and an output from the optical imaging output image analysis functionality and providing an object detection output.

In accordance with a preferred embodiment of the present invention the rotatable sensor assembly includes an imaging radar sub-assembly, an optical imaging sub-assembly and object detection functionality receiving a radar image output from the imaging radar sub-assembly and an optical image output from the optical imaging sub-assembly and providing an object detection output.

There is also provided in accordance with a preferred embodiment of the present invention, an object detection method for use in airports including providing an airport travel surface light assembly, operating a rotatable sensor assembly mounted on the airport travel surface light assembly for sensing objects and operating an omnidirectional illuminator mounted above the rotatable sensor assembly.

Preferably, the omnidirectional illuminator is mounted on the rotatable sensor assembly for rotation therewith.

In accordance with a preferred embodiment of the present invention the method also includes providing at least first and second generally oppositely directed directional illuminators. Additionally, the at least first and second generally oppositely directed directional illuminators include at least first and second generally oppositely directed LED directional illuminators.

Preferably, the airport travel surface light assembly includes a static airport travel surface light assembly.

In accordance with a preferred embodiment of the present invention the operating a rotatable sensor assembly includes operating an imaging radar sub-assembly including imaging radar output image analysis functionality, operating an optical imaging sub-assembly including optical imaging output image analysis functionality and operating object detection functionality receiving an output from the imaging radar output image analysis functionality and an output from the optical imaging output image analysis functionality and providing an object detection output.

In accordance with a preferred embodiment of the present invention the operating a rotatable sensor assembly includes operating an imaging radar sub-assembly, operating an optical imaging sub-assembly, and operating object detection functionality receiving a radar image output from the imaging radar sub-assembly and an optical image output from the optical imaging sub-assembly and providing an object detection output.

BRIEF DESCRIPTION OF THE DRAWINGS

The present invention will be understood more fully from the following detailed description, taken in conjunction with the drawings in which.

DETAILED DESCRIPTION OF A PREFERRED EMBODIMENT

Reference is now made to FIGS. 1, 2, 3 and 4, which are simplified respective front, right, left and rear views of an object detection system for use in airports constructed and operative in accordance with a preferred embodiment of the present invention.

As seen in FIGS. 1-4, there is provided an object detection system 100 including a base portion 102 having an upper portion 104 mounted thereupon. The upper portion 104 includes a rotatable sensor assembly 106 mounted upon a mounting portion 108 and having an omnidirectional illuminator 110 mounted thereabove. Base portion 102 includes a water-sealed main image and data processing system enclosed therewithin (not shown).

It is a particular feature of this embodiment of the present invention that the mounting portion 108 is formed with two housing sections 112, each of sections 112 housing one of two generally oppositely directed LED directional illuminators 114. The two housing sections 112 are circumferentially joined together to form a cylindrical exterior enclosure for the mounting portion 108.

Figure 1:
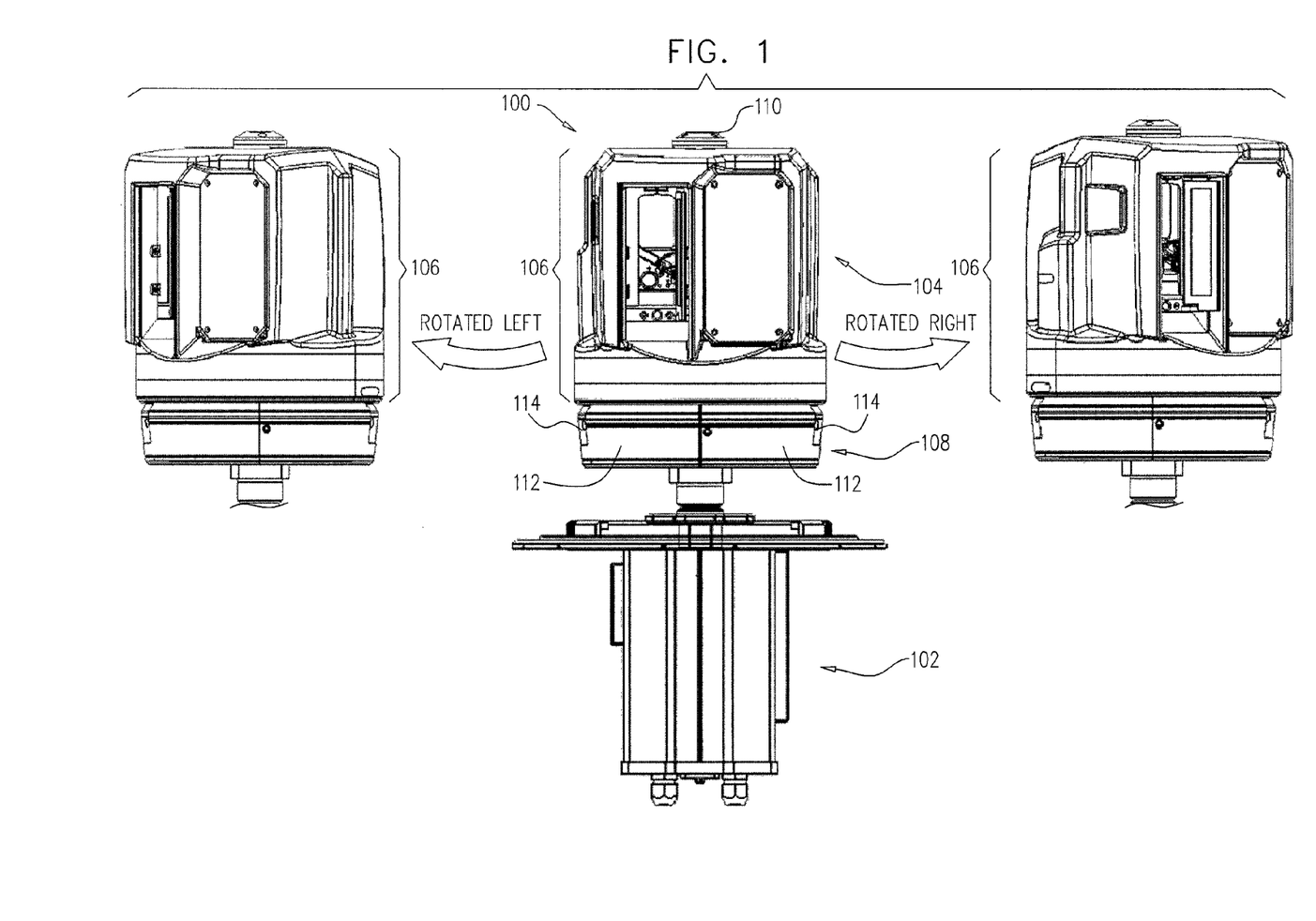
FIGS. 1, 2, 3 and 4 are simplified respective front, right, left and rear views of an object detection system for use in airports constructed and operative in accordance with a preferred embodiment of the present invention.
Figure 2:
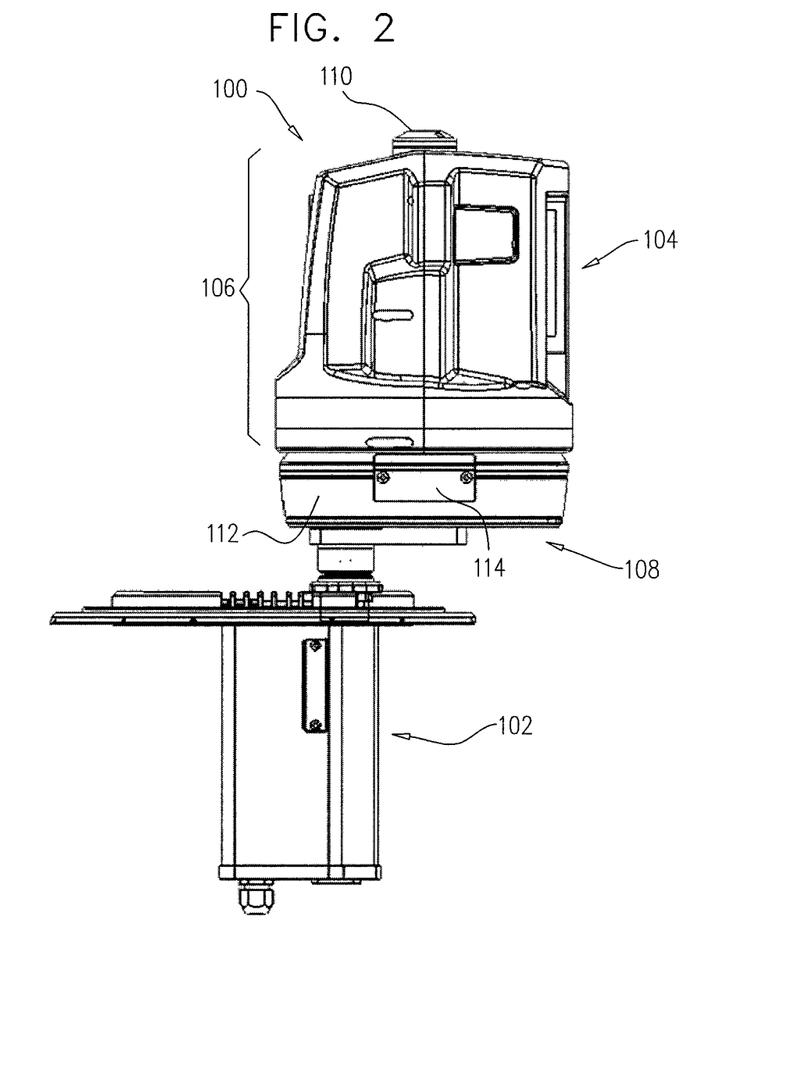
Figure 3:
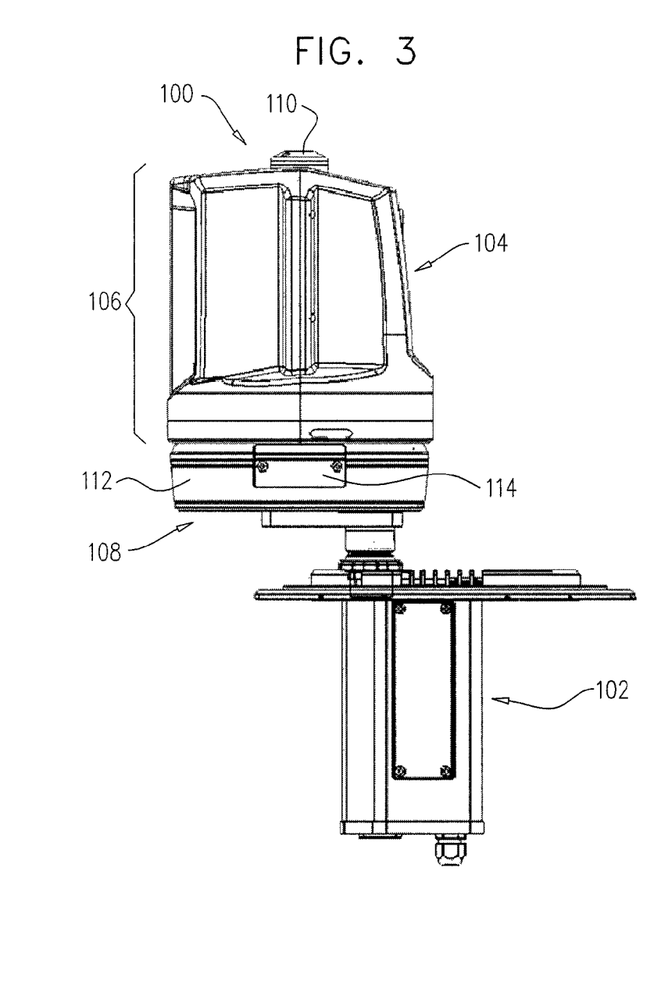
Figure 4:
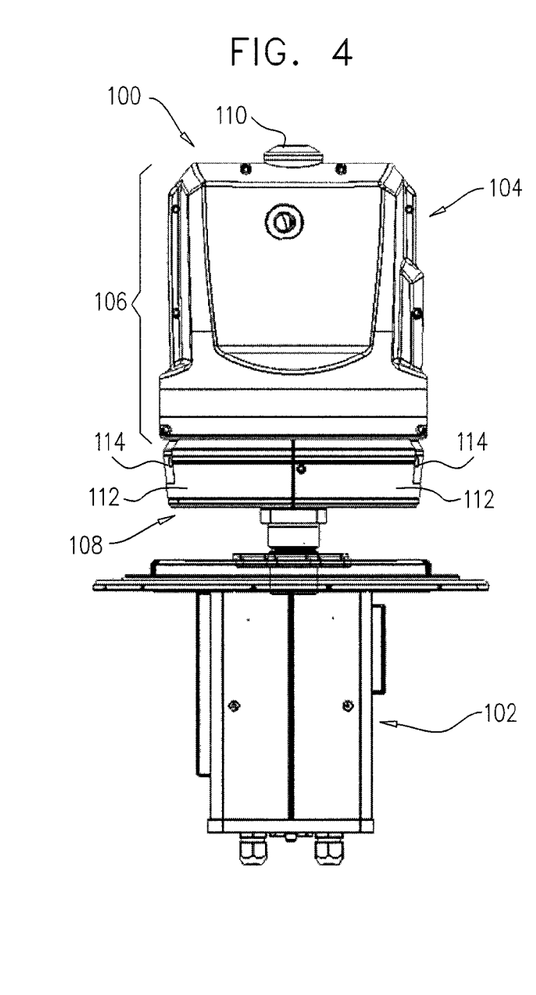
Figure 5:
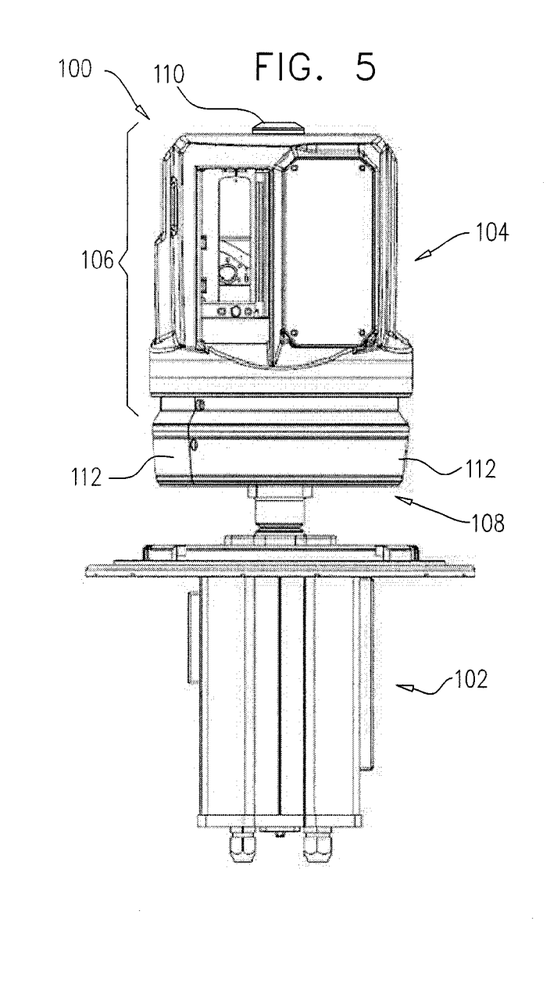
FIGS. 5 and 6 are simplified respective front and rear views, corresponding to FIG. 1, of an alternative embodiment of the object detection system of FIG. 1 which does not include two generally oppositely directed LED directional illuminators.
Figure 6:
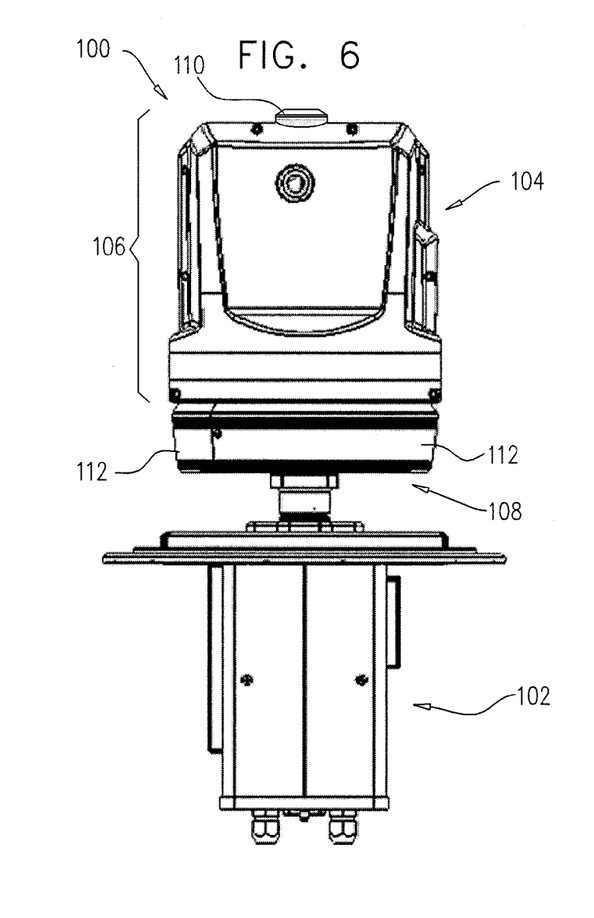

Reference is now made to FIGS. 5 and 6, which are simplified respective front and rear views corresponding to FIG. 1 of an alternative embodiment of the object detection system of FIG. 1 which does not include two generally oppositely directed LED directional illuminators.

The alternative embodiment shown in FIGS. 5 and 6 is generally identical in structure and operation to the embodiment of FIGS. 1-4, with except that the two generally oppositely directed LED directional illuminators 114 in the embodiment of FIGS. 1-4 are obviated in the embodiment of FIGS. 5 and 6.

Figure 7:
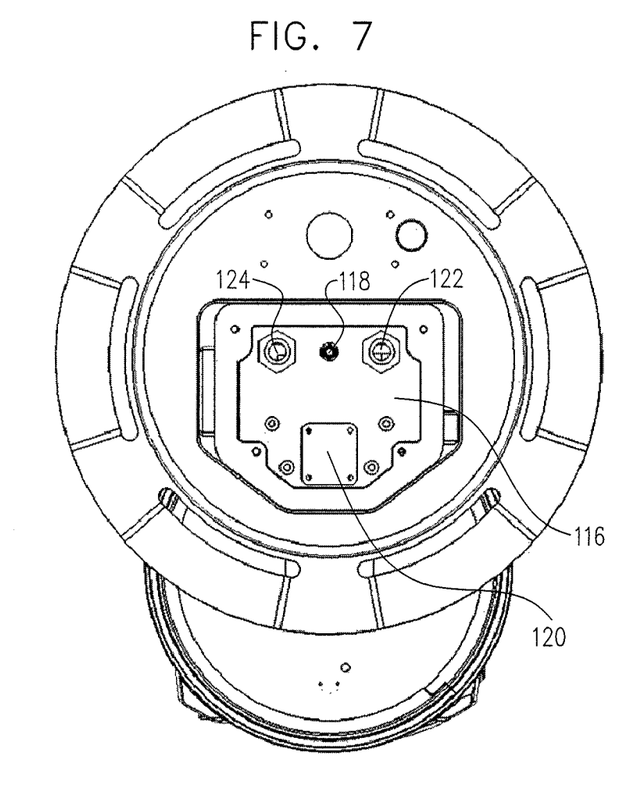
FIG. 7 is a simplified upwardly facing bottom view of the object detection system of FIG. 1.

Reference is now made to FIG. 7, which is a simplified upwardly facing bottom view of the object detection system 100 of FIG. 1. As seen in FIG. 7, the bottom of base portion 102 is formed with a connector housing plate 116 having a wireless communication connector 118, a sealed wired communication connector 120, a sealed main power input connector 122 and an individual light control output connector 124.

Figure 8:
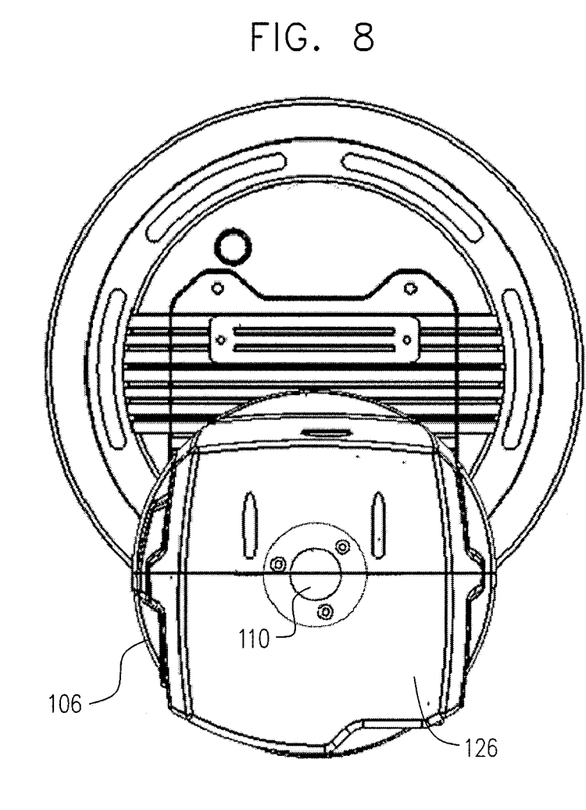
FIG. 8 is a simplified downwardly facing top view of the object detection system of FIG. 1.

Reference is now made to FIG. 8, which is a simplified downwardly facing top view of the object detection system of FIG. 1. As seen clearly in FIG. 8, the omnidirectional illuminator 110 is mounted upon an upwardly facing surface 126 of the rotatable sensor assembly 106.

Figure 9A:
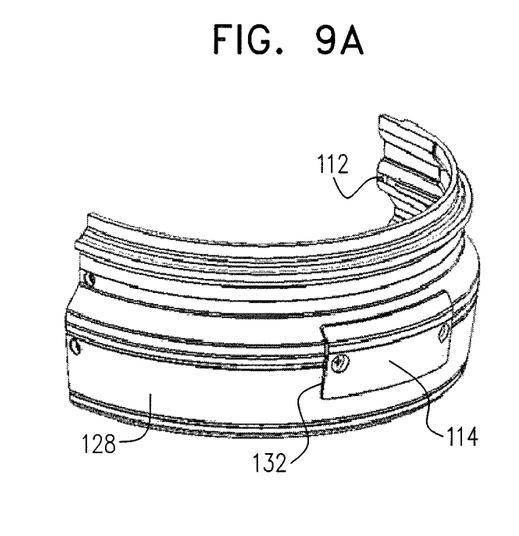
FIGS. 9A and 9B are simplified pictorial illustrations of a housing section and a LED directional illuminator mounted therewithin forming part of the object detection system of FIG. 1, FIG. 9A illustrating an outwardly facing surface of the housing section and FIG. 9B illustrating an inwardly facing surface of the housing section.
Figure 9B:
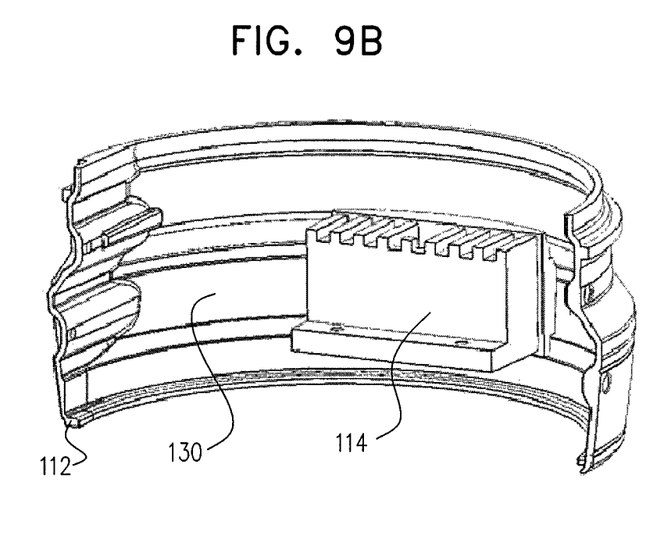

Reference is now made to FIGS. 9A and 9B, which are simplified pictorial illustrations of a housing section 112, including LED directional illuminator 114 mounted therewithin, forming part of the object detection system of FIG. 1, FIG. 9A illustrating an outwardly facing surface 128 of housing section 112 and FIG. 9B illustrating an inwardly facing surface 130 of housing section 112.

As seen in FIGS. 9A and 9B, housing section 112 is formed with a rectangular aperture 132 sealingly enclosing LED directional illuminator 114 mounted therewithin.

Figure 10:
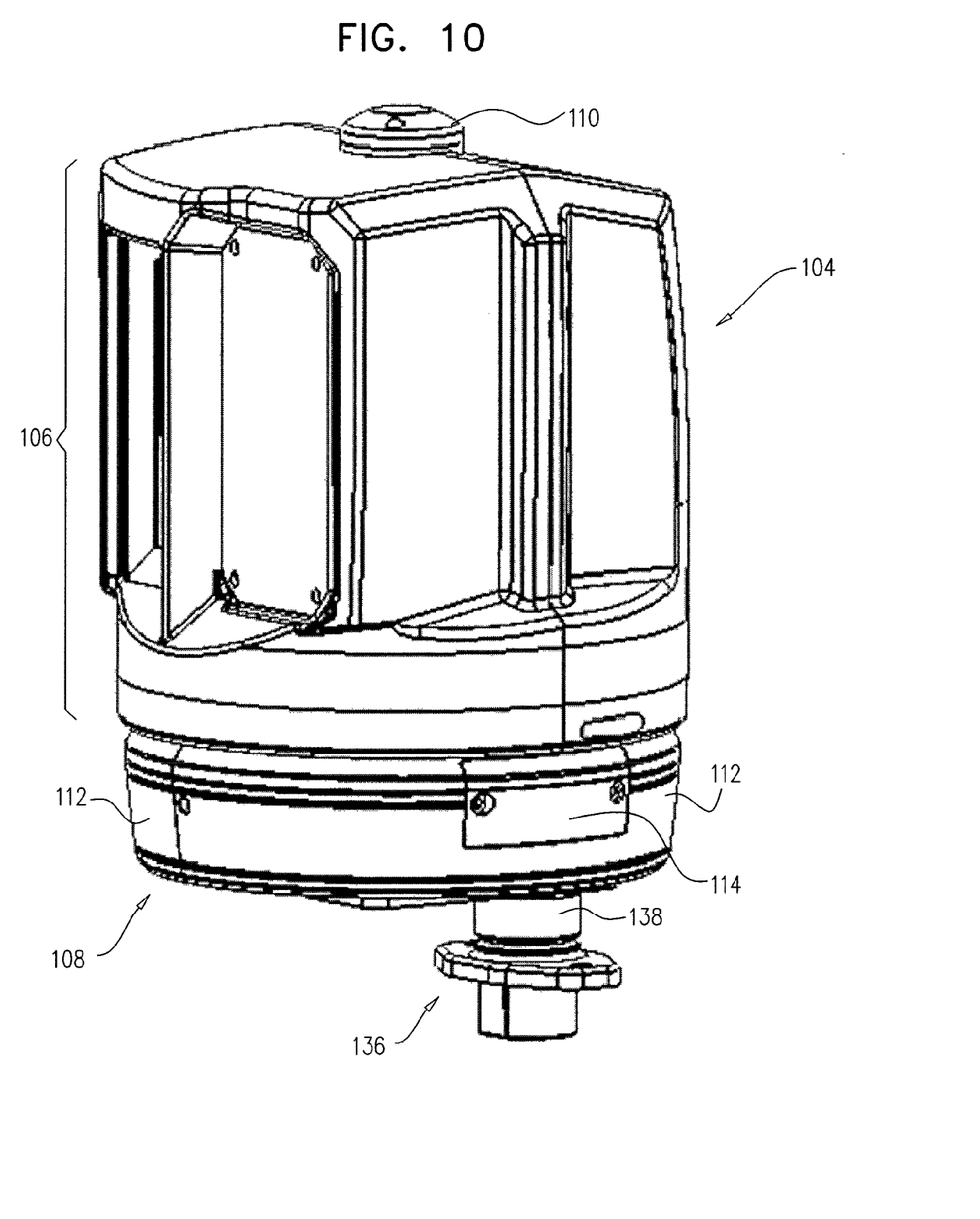
FIG. 10 is a simplified pictorial illustration of an upper portion of the object detection system of FIG. 1.

Reference is now made to FIG. 10, which is a simplified pictorial illustration of the upper portion 104 of the object detection system 100 of FIG. 1, and to FIGS. 11, 12, 13 and 14 which are simplified respective pictorial, left, front and right side view illustrations of the upper portion 104 of FIG. 10, when an exterior housing portion is removed.

As noted above, the upper portion 104 preferably includes a rotatable sensor assembly 106 mounted upon a mounting portion 108 and having an omnidirectional illuminator 110 mounted thereabove. As seen in FIGS. 10-14, the upper portion 104 is mounted upon the base portion 102 via a vertical mounting arm 136 which is formed with a coupling mechanism 138, preferably a frangible coupling mechanism.

Figure 11:
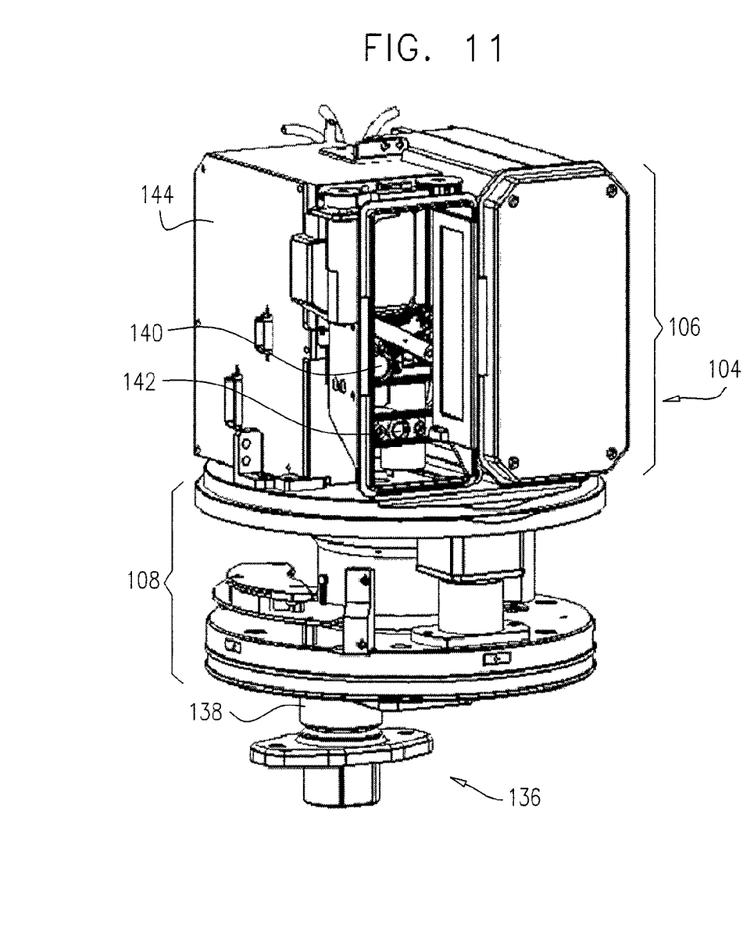
FIG. 11 is a simplified pictorial illustration of the upper portion of FIG. 10 not including an exterior housing.
Figure 12:
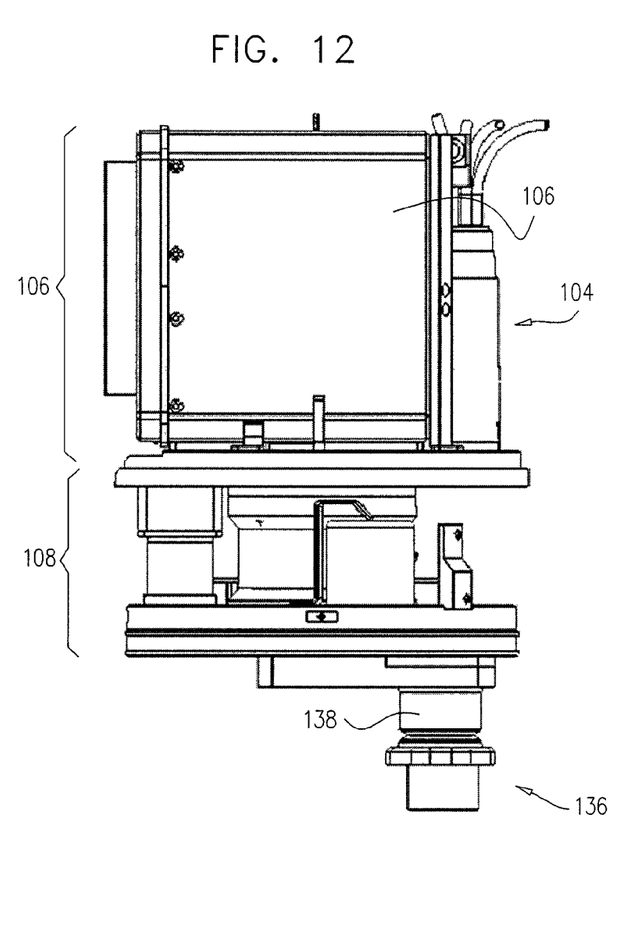
FIGS. 12, 13 and 14 are simplified respective left, front and right side views of the upper portion of FIG. 10 not including the exterior housing.
Figure 13:
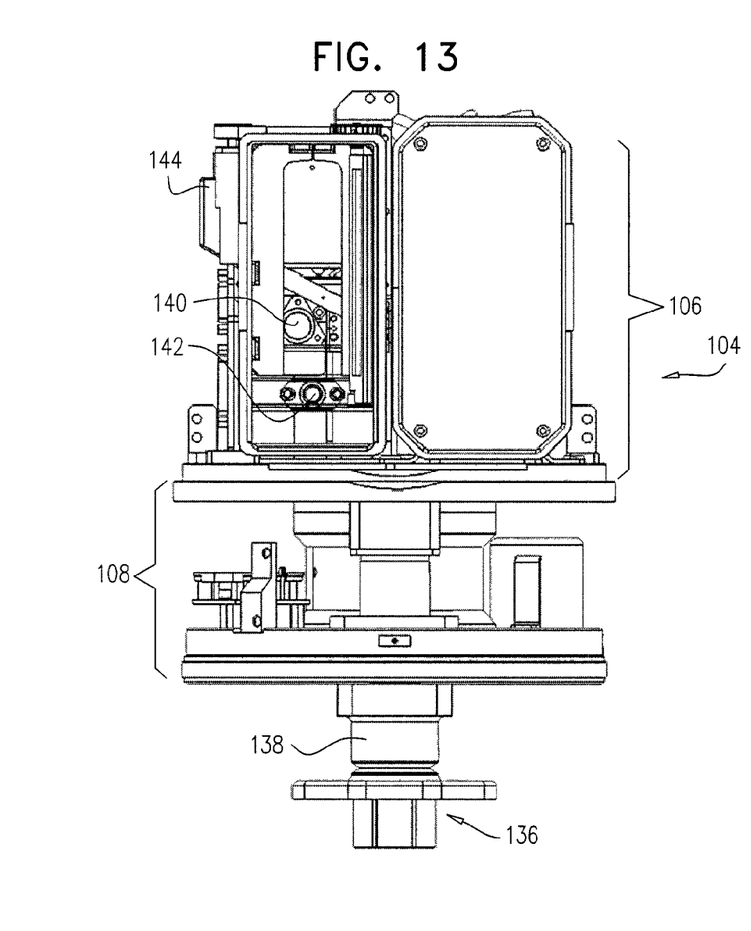
Figure 14:
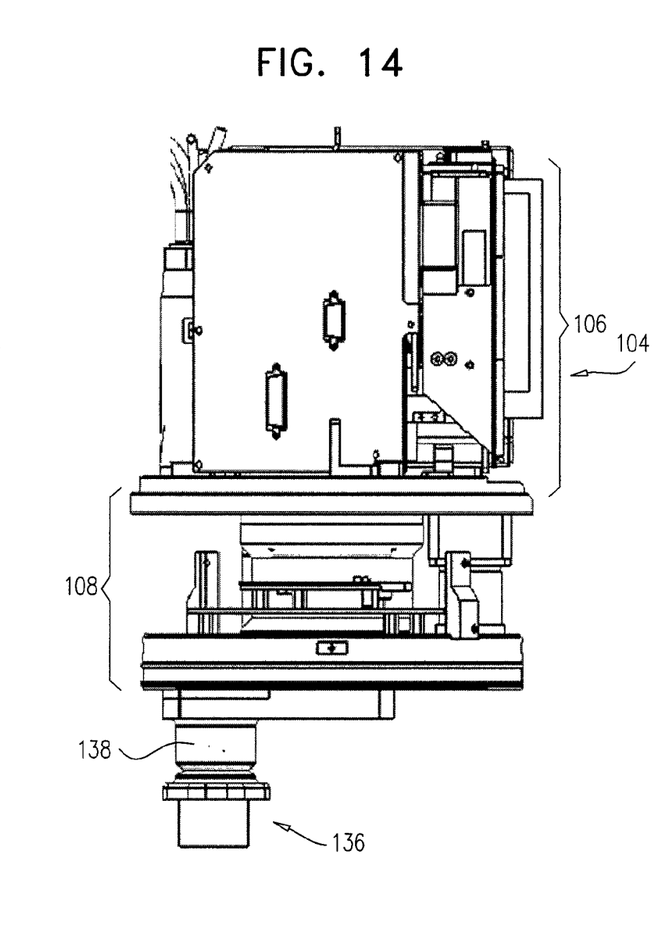

As seen in FIGS. 11 and 13, the rotatable sensor assembly 106 includes a near infrared illuminator 140 and a laser line pointer 142 mounted within an optical imaging sub-assembly 144.

Figure 15:
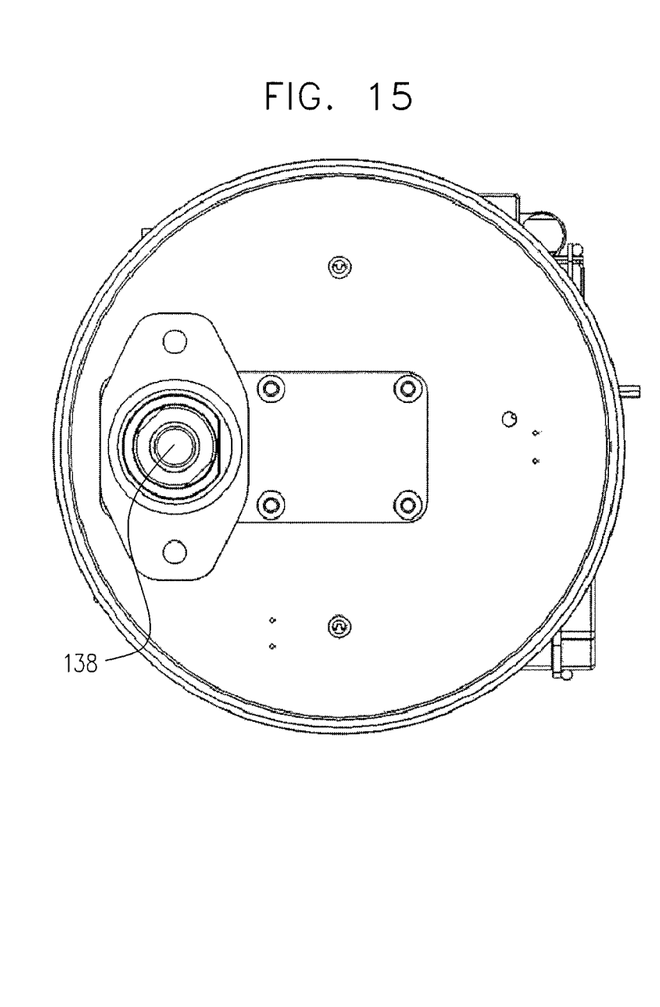
FIGS. 15 and 16 are simplified respective upwardly facing bottom and downwardly facing top views of the upper portion of FIG. 10 not including the exterior housing.
Figure 16:
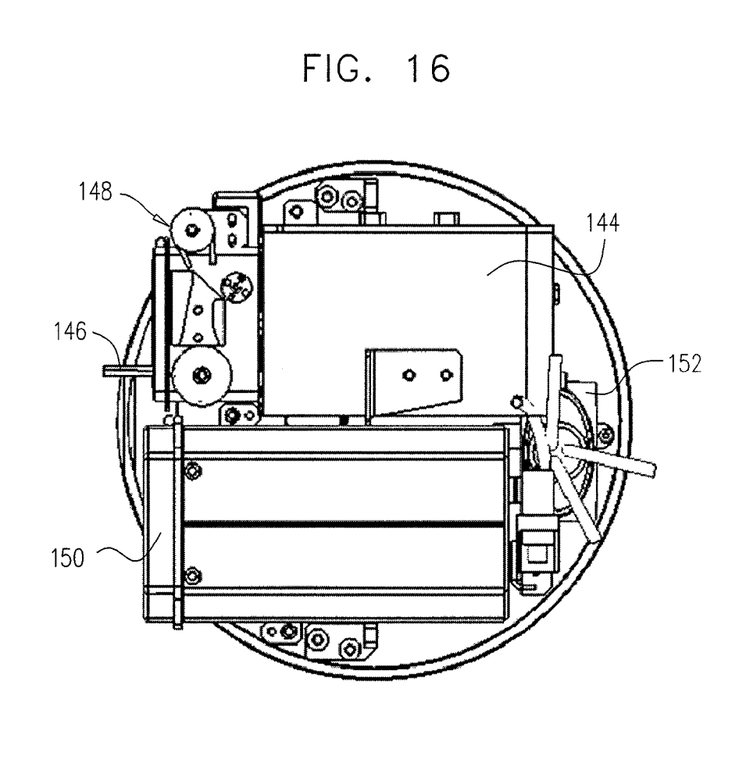

Reference is now made to FIGS. 15 and 16, which are respectively, a simplified upwardly facing bottom view and a simplified downwardly facing top view of the upper portion 104 of FIG. 10 when an exterior housing portion is removed. As noted above and as seen in FIG. 15, the vertical mounting arm 136 is formed with a coupling mechanism 138.

As seen in FIG. 16, the rotatable sensor assembly 106 includes an optical imaging sub-assembly 144 having a closable sealing door 146 operated by a door motor 148, an imaging radar sub-assembly 150, and an optical elements cleaning mechanism assembly 152.

Figure 17:
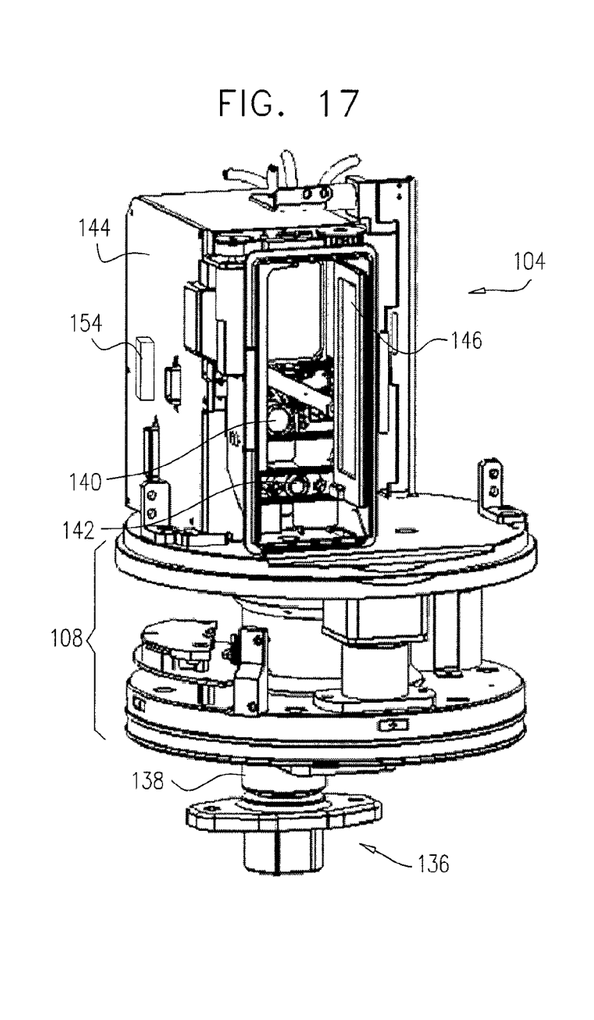
FIGS. 17, 18 and 19 are simplified respective pictorial, front view and downwardly facing top view illustrations of the upper portion of FIG. 10 not including the exterior housing and a radar sub-assembly.
Figure 18:
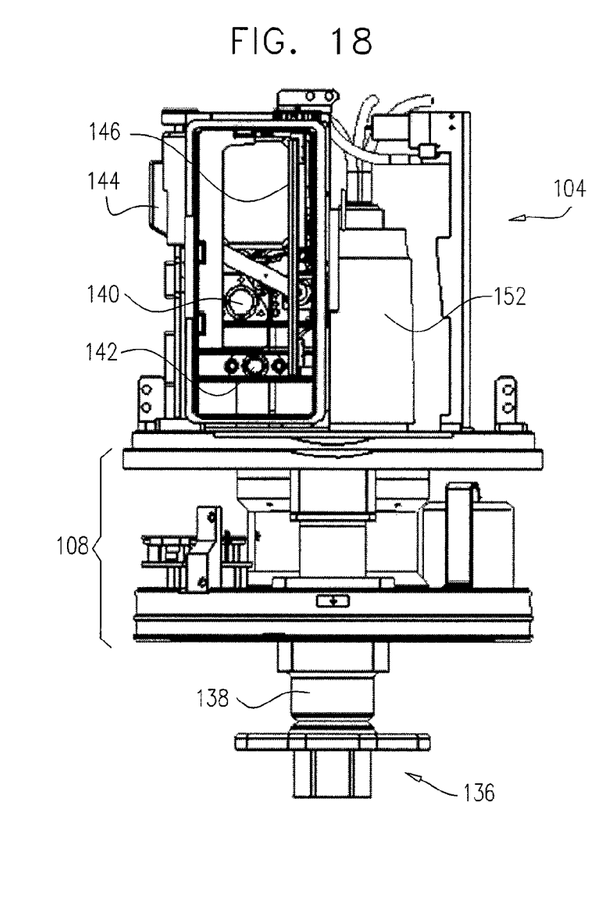
Figure 19:
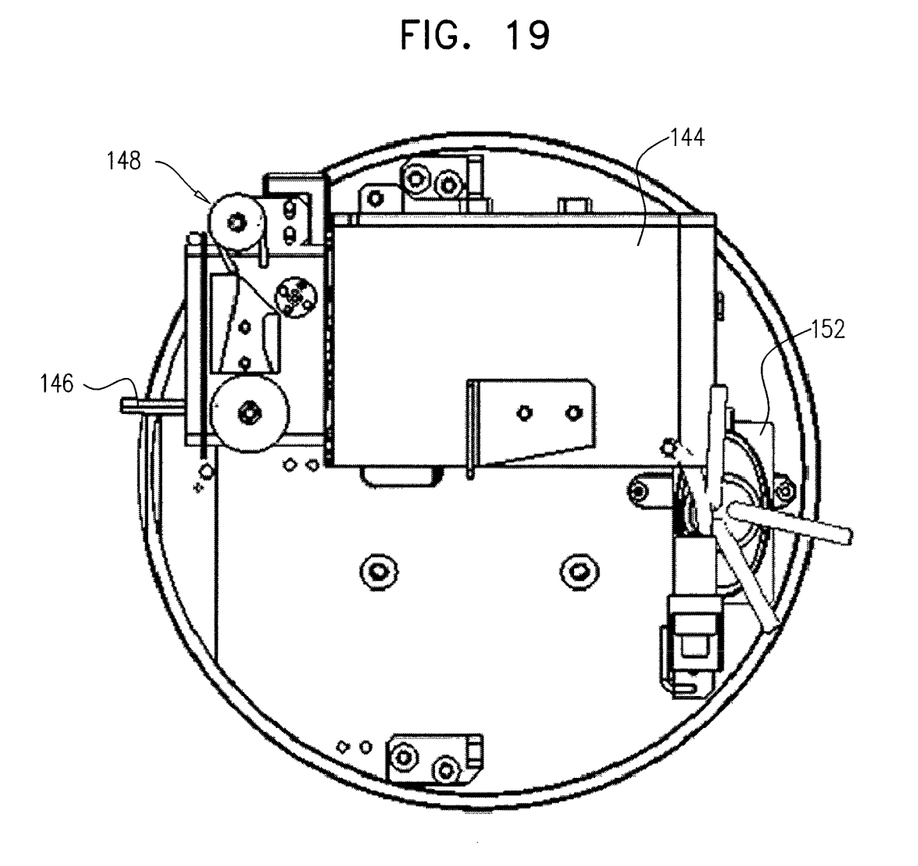

Reference is now made to FIGS. 17, 18 and 19 which are simplified respective pictorial, front view and downwardly facing top view illustrations of the upper portion 104 of FIG. 10 when an exterior housing and the radar sub-assembly 150 are removed. As noted above and as seen in FIG. 17, the optical imaging sub-assembly 144 includes a near infrared illuminator 140 and a laser line pointer 142 mounted therewithin, and a closable sealing door 146 operated by a door motor 148. An omnidirectional illuminator controller 154 controlling the omnidirectional illuminator 110 is mounted on the exterior of the optical imaging sub-assembly 144.

Figure 20:
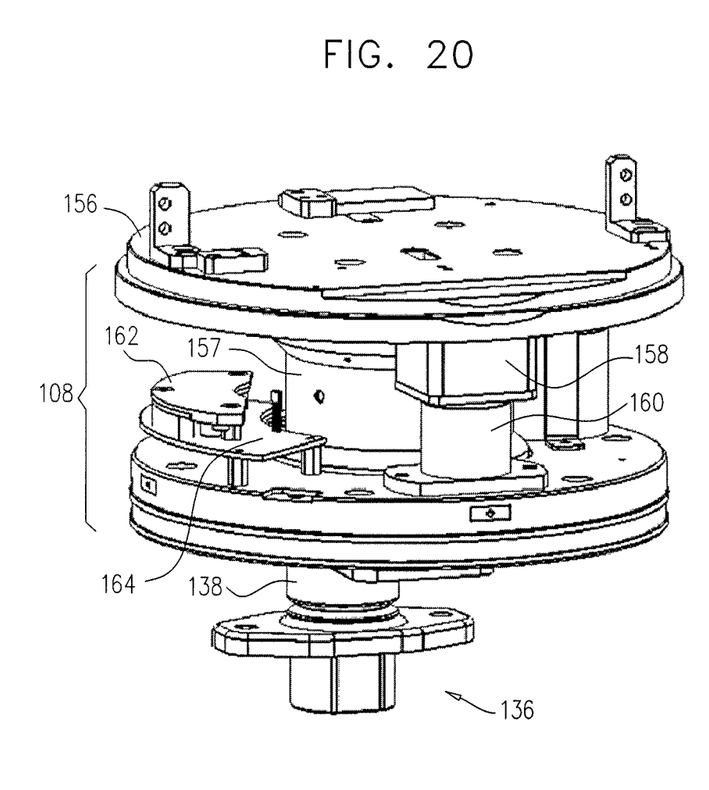
FIGS. 20 and 21 are simplified respective pictorial and front view illustrations of a mounting portion of the upper portion of FIG. 10.
Figure 21:
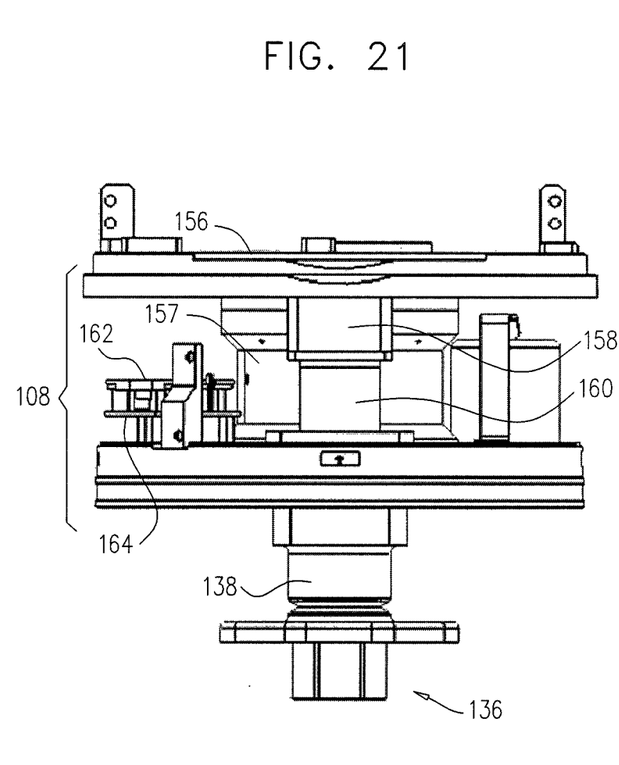

Reference is now made to FIGS. 20 and 21, which are simplified respective pictorial and front view illustrations of the mounting portion 108 of the upper portion 104 of FIG. 10. As noted above, mounting portion 108 includes a vertical mounting arm 136 which is formed with a frangible coupling mechanism 138.

As seen in FIGS. 20 and 21, mounting portion 108 includes a rotating platform 156 mounted upon a rotating vertical shaft 157. Rotating platform 156 supports the rotatable sensor assembly 106 mounted thereupon. Mounting portion 108 also includes a rotational motor 158 which is coupled to a gear mechanism 160 and is controlled by a rotational motor controller 162. Gear mechanism 160 is operatively coupled to the rotating vertical shaft 157. Mounting portion 108 also includes a bi-directional illuminator controller 164.

Figure 22:
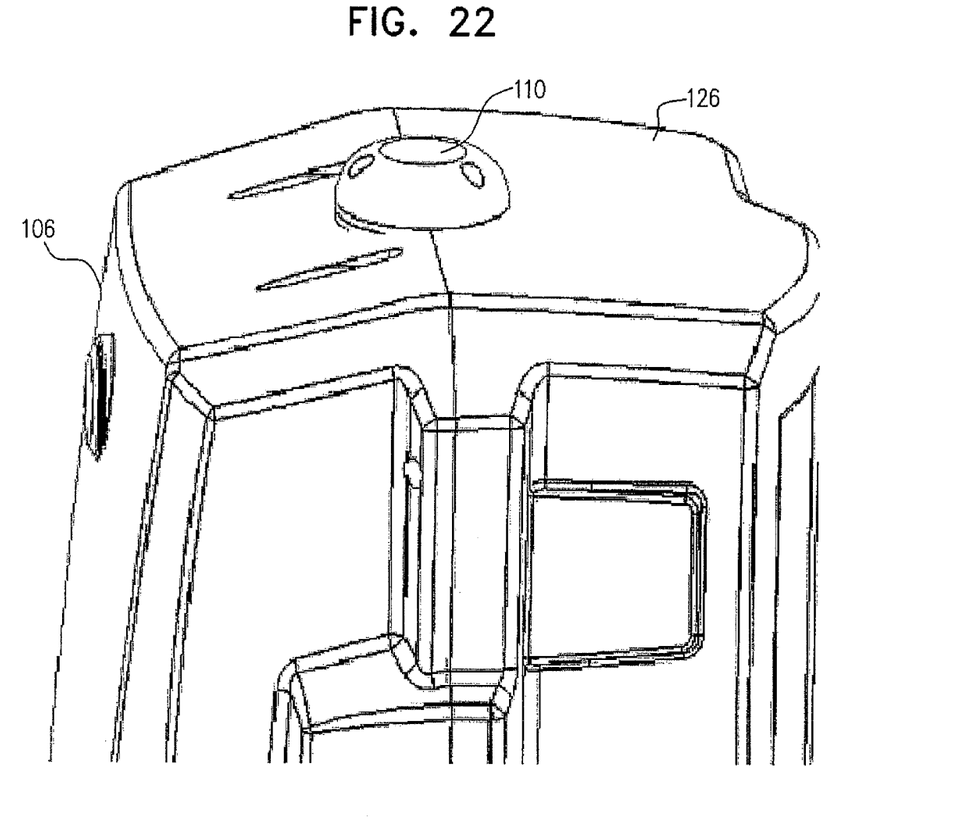
FIG. 22 is a simplified pictorial illustration of the omnidirectional illuminator of the object detection system of FIG. 1.

Reference is now made to FIG. 22, which is a simplified pictorial illustration of the omnidirectional illuminator 110 of the object detection system 100 of FIG. 1. As noted above and as seen in FIG. 22, omnidirectional illuminator 110 is mounted upon an upwardly facing surface 126 of the rotatable sensor assembly 106.

As noted above, object detection system 100 includes optical imaging sub-assembly 144 and imaging radar sub-assembly 150. Object detection system 100 also preferably includes object detection functionality operative to receive at least one output from at least one of optical imaging sub-assembly 144 and imaging radar sub-assembly 150 and to provide a real time object detection output. In the event an object detection output indicates the presence of a foreign object, a suitable alarm signal may be provided.

Optical imaging sub-assembly 144 preferably includes optical imaging output image analysis functionality operative to analyze an image to determine the presence of an object in the field of view of the optical imaging sub-assembly.

Imaging radar sub-assembly 150 preferably includes imaging radar output image analysis functionality operative to analyze a radar output image to determine the presence of an object in the field of view of the imaging radar sub-assembly.

It will be appreciated by persons skilled in the art that the present invention is not limited by what has been particularly shown and described hereinabove. Rather the scope of the present invention includes both combinations and subcombinations of various features described hereinabove as well as variations and modifications thereof which are not in the prior art.

The invention claimed is:

1. An object detection system for use in airports comprising:
   a mounting portion formed with two housing sections circumferentially joined together to form a cylindrical exterior enclosure;
   an airport travel surface light assembly including:
      at least first and second illuminator housings; and
      at least first and second generally oppositely directed directional airport surface illuminators housed in said at least first and second illuminator housings, each of said first and second illuminator housings being housed inside of a corresponding one of said two housing sections;
   a rotatable sensor assembly mounted on said airport travel surface light assembly for sensing objects; and
   an omnidirectional illuminator mounted above said rotatable sensor assembly,
   each of said two housing sections being formed with a rectangular aperture sealingly enclosing a corresponding one of said first and second generally oppositely directed directional airport surface illuminators.

2. An object detection system according to claim 1 and wherein said at least first and second generally oppositely directed directional airport surface illuminators comprise at least first and second generally oppositely directed LED directional illuminators.

3. An object detection system according to claim 1 and wherein said airport travel surface light assembly comprises a static airport travel surface light assembly.

4. An object detection system according to claim 1 and wherein said rotatable sensor assembly includes:
   an imaging radar sub-assembly including imaging radar output image analysis functionality;
   an optical imaging sub-assembly including optical imaging output image analysis functionality; and
   object detection functionality receiving an output from the imaging radar output image analysis functionality and an output from the optical imaging output image analysis functionality and providing an object detection output.

5. An object detection system according to claim 1 and wherein said rotatable sensor assembly includes:
   an imaging radar sub-assembly;
   an optical imaging sub-assembly; and
   object detection functionality receiving a radar image output from the imaging radar sub-assembly and an optical image output from the optical imaging sub-assembly and providing an object detection output.

6. An object detection method for use in airports comprising:
   providing an object detection system including an airport travel surface light assembly including at least first and second illuminator housings and at least first and second generally oppositely directed directional airport surface illuminators, each of said first and second illuminator housings being housed inside a corresponding one of two housing sections of a mounting portion, said two housing sections being circumferentially joined together to form a cylindrical exterior enclosure, each of said two housing sections being formed with a rectangular aperture sealingly enclosing a corresponding one of said first and second generally oppositely directed directional airport surface illuminators, said object detection system also including a rotatable sensor assembly mounted on said airport travel surface light assembly and an omnidirectional illuminator mounted above said rotatable sensor assembly; and
   sensing objects using said rotatable sensor assembly.

7. An object detection method according to claim 6 and wherein said at least first and second generally oppositely directed directional airport surface illuminators comprise at least first and second generally oppositely directed LED directional illuminators.

8. An object detection method according to claim 6 and wherein said airport travel surface light assembly comprises a static airport travel surface light assembly.

9. An object detection method according to claim 6 and wherein said sensing objects using said rotatable sensor assembly includes:
   imaging an airport travel surface using an imaging radar sub-assembly including imaging radar output image analysis functionality;
   imaging an airport travel surface using an optical imaging sub-assembly including optical imaging output image analysis functionality; and
   receiving an output from the imaging radar output image analysis functionality and an output from the optical imaging output image analysis functionality and providing an object detection output.

10. An object detection method according to claim 6 and wherein said sensing objects using a rotatable sensor assembly includes:
   imaging an airport travel surface using an imaging radar sub-assembly;
   imaging an airport travel surface using an optical imaging sub-assembly; and
   receiving a radar image output from the imaging radar sub-assembly and an optical image output from the optical imaging sub-assembly and providing an object detection output.

* * * * *